United States Patent
Kallin et al.

(10) Patent No.: US 8,619,708 B2
(45) Date of Patent: Dec. 31, 2013

(54) OPTIMIZING A QUALITY OF SERVICE (QOS) VIA LOAD BALANCING

(75) Inventors: Harald Kallin, Sollentuna (SE); Birgitta Olin, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 578 days.

(21) Appl. No.: 12/627,138

(22) Filed: Nov. 30, 2009

(65) Prior Publication Data

US 2011/0128862 A1 Jun. 2, 2011

(51) Int. Cl.
*H04W 4/00* (2009.01)

(52) U.S. Cl.
USPC ............ 370/331; 455/436; 455/437; 455/438

(58) Field of Classification Search
USPC ............................ 370/331; 455/436, 437, 438
See application file for complete search history.

(56) References Cited

U.S. PATENT DOCUMENTS

| | | | |
|---|---|---|---|
| 4,670,899 A | 6/1987 | Brody et al. | 379/60 |
| 5,241,685 A | 8/1993 | Bodin et al. | 455/33.2 |
| 2001/0005677 A1* | 6/2001 | Dempo et al. | 455/436 |
| 2006/0142021 A1* | 6/2006 | Mueckenheim et al. | 455/453 |
| 2011/0170518 A1* | 7/2011 | Randriamasy et al. | 370/331 |

FOREIGN PATENT DOCUMENTS

| WO | WO 2004/043104 A1 | 5/2004 |
|---|---|---|
| WO | WO 2007/028252 A2 | 3/2007 |

OTHER PUBLICATIONS

Son et al. "Dynamic Association for Load Balancing and Interference Avoidance in Multi-Cell Networks" Mar. 2008, IEEE.*
"Non-GBR QoS indication for Load Balancing SON use case"; Source: Nortel, Orange; 3GPP TSG RAN WG2 #61bis; Apr. 4-31, 2008; Shenzhen, China; #GPP TSG-RAN WG3 #62, Nov. 10-14, 2008; Prague, Czech Republic; pp. 1-2.
International Search Report and Written Opinion of the International Searching Authority corresponding to International Application No. PCT/SE2010/051162; Date of Mailing: Mar. 10, 2011; 12 pages.
Nasri et al. "Handover Adaption for Dynamic Load Balancing in 3GPP Long Term Evolution Systems"; Proceedings of MoMM 2007; pp. 145-154; URL: http://research.mercubuana.ac.id/proceeding/MoMM162007.pdf.
Son et al. "Dynamic Association for Load Balancing and Interference Avoidance in Multi-cell Networks", Wireless Communications, IEEE Transactions on vol. 8, No. 7, Jul. 2009; URL: http://ieeexplore.ieee.org/Xplore/login.jsp?url=http%3A%2F%2Fieeexplore.ieee.org%2Fstamp%2Fstamp.jsp%3Ftp%3D%26arnumber%3D5165320%26isnumber%3D5165281&authDecision=-203 ; pp. 3566-3576.

* cited by examiner

*Primary Examiner* — Omer Mian
(74) *Attorney, Agent, or Firm* — Myers Bigel Sibley & Sajovec, P.A.

(57) ABSTRACT

A device detects an overload in a serving cell of a wireless network based on information associated with the serving cell, and determines, when the overload in the serving cell is detected, user equipment in the serving cell that are candidates to move to a target cell of the wireless network based on calculated user throughputs of user equipment in the serving cell. The device also selects one or more of the candidate user equipment to move to the target cell, and moves the selected user equipment to the target cell.

13 Claims, 14 Drawing Sheets

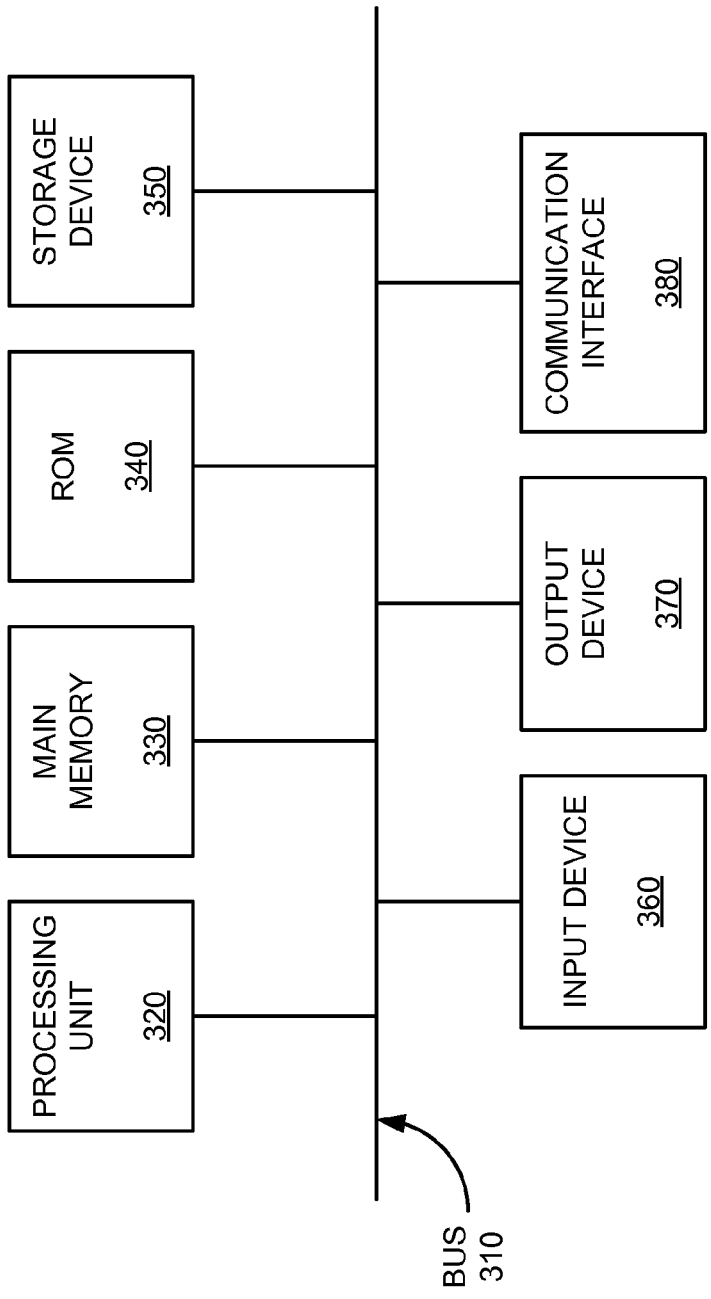

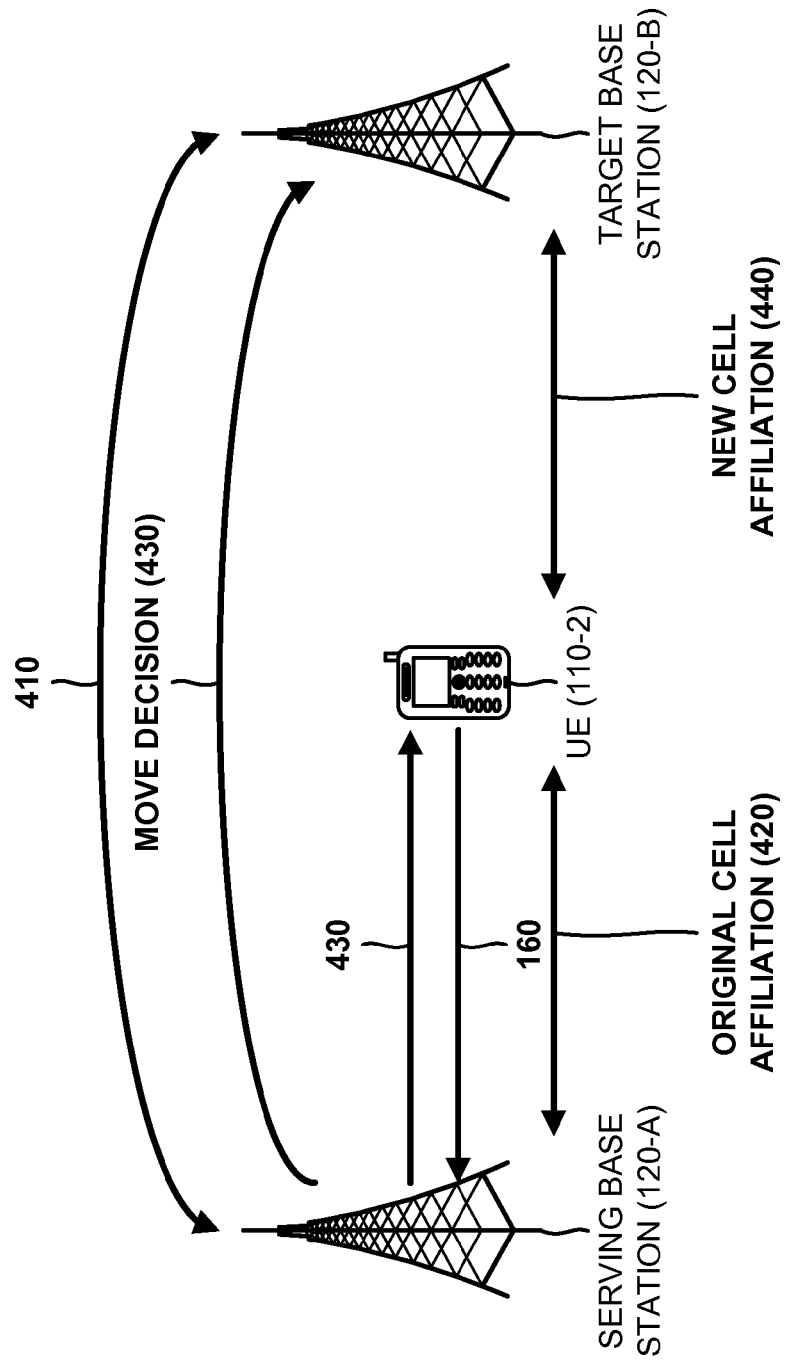

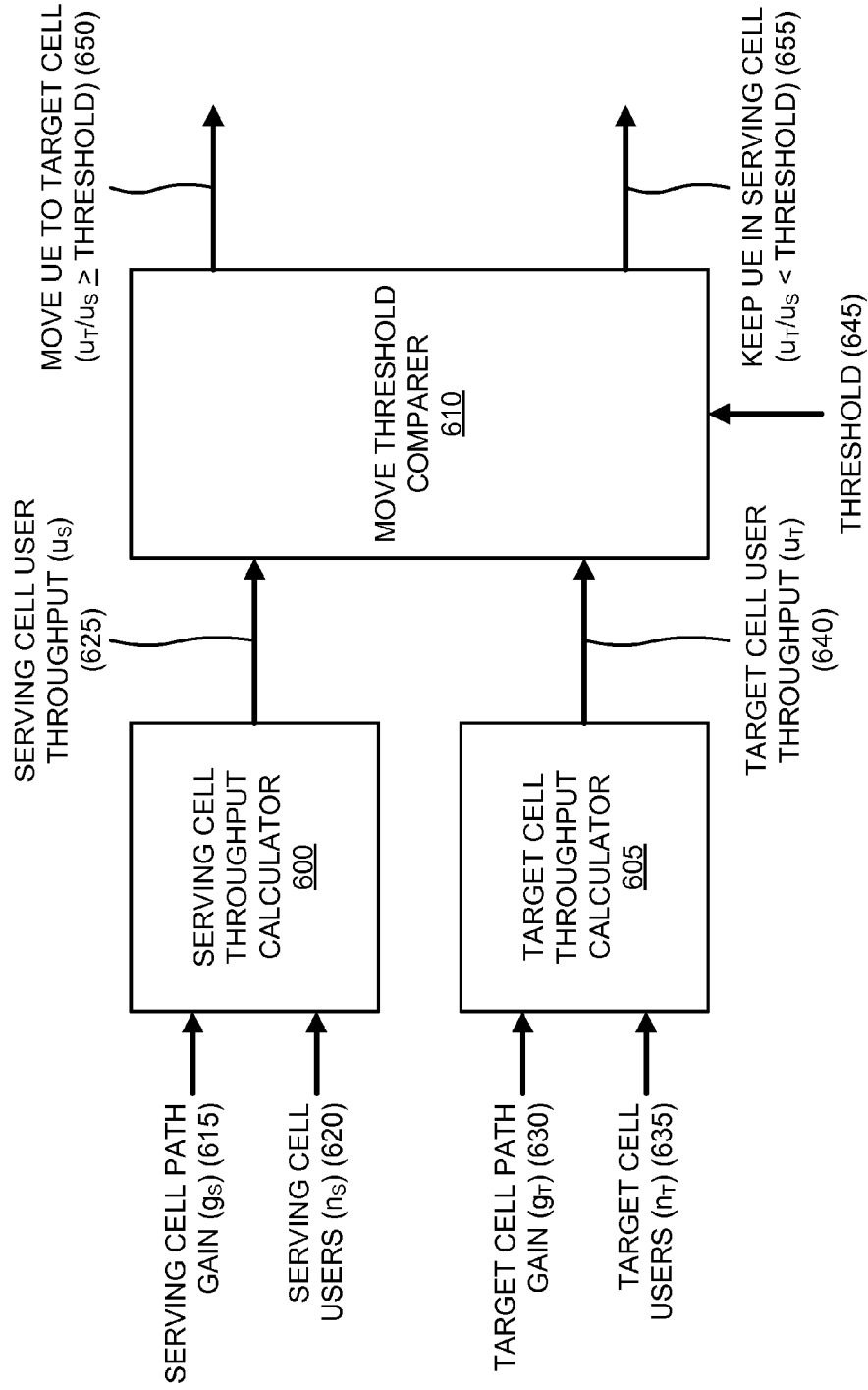

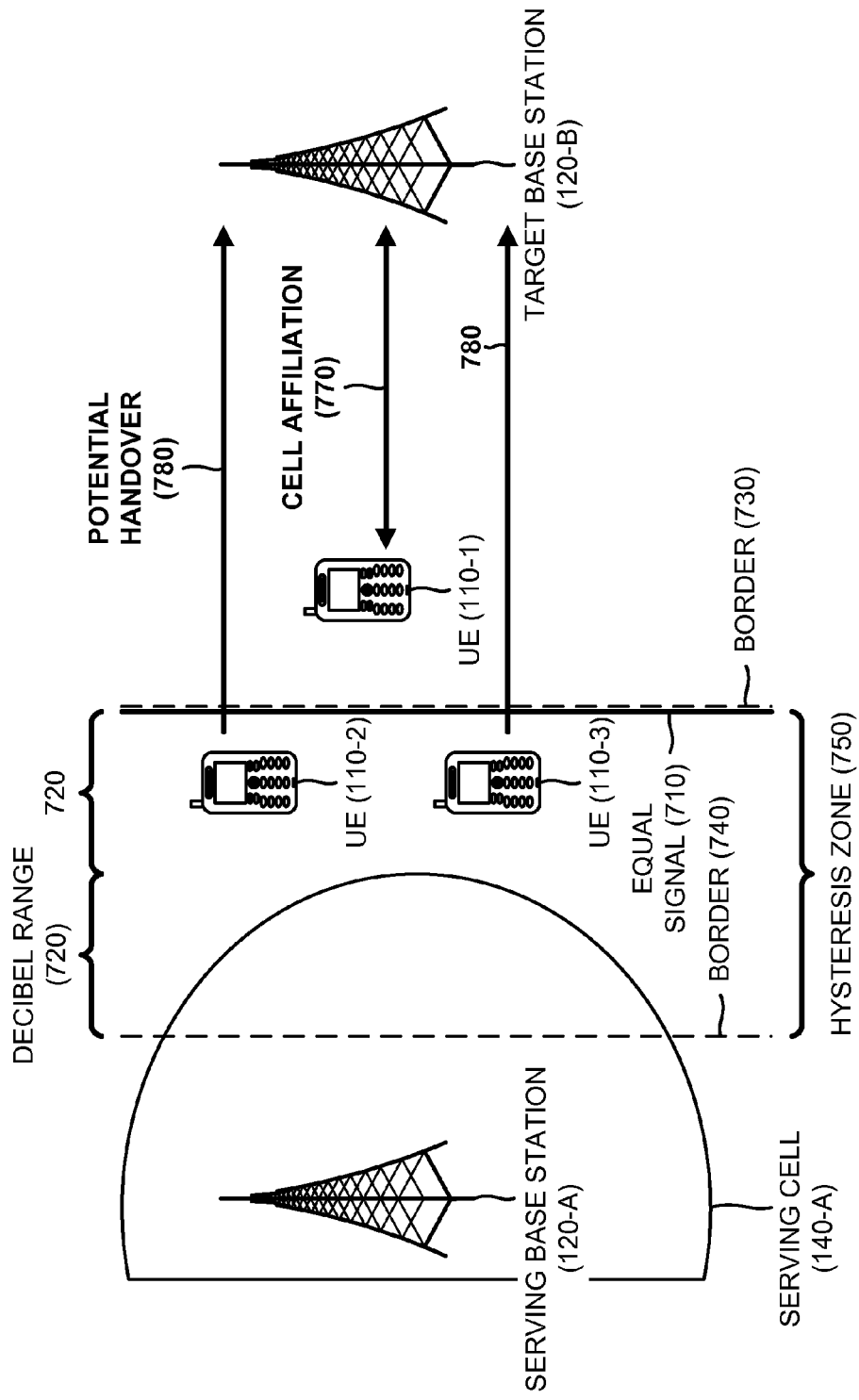

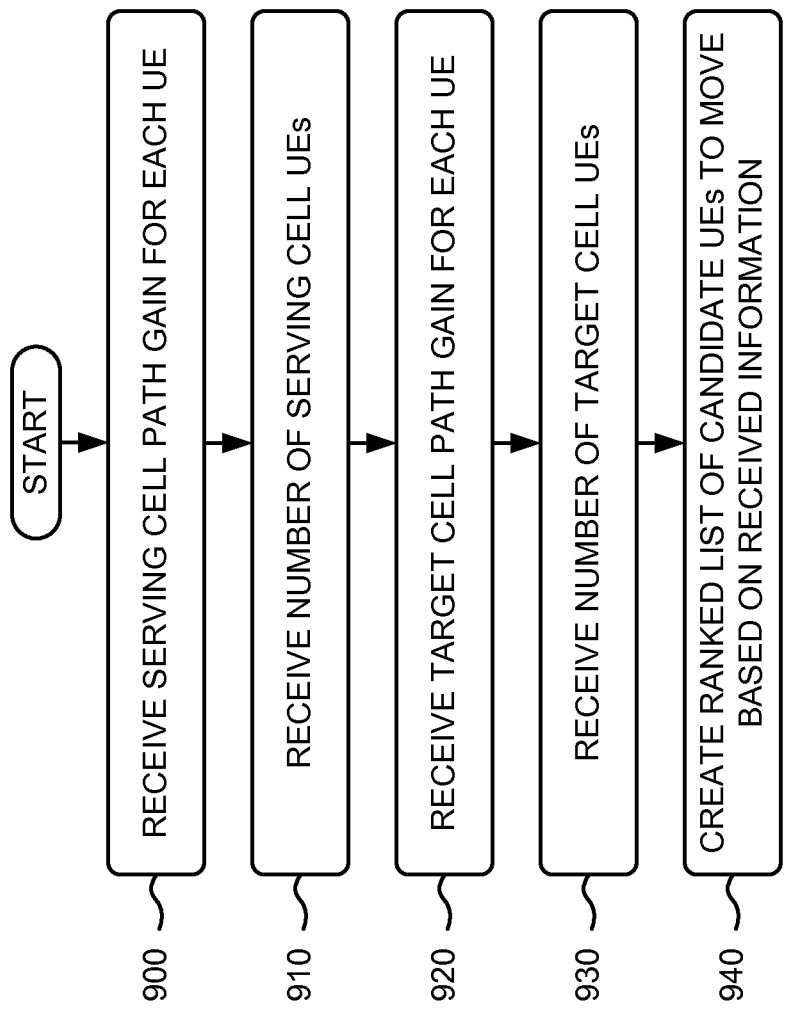

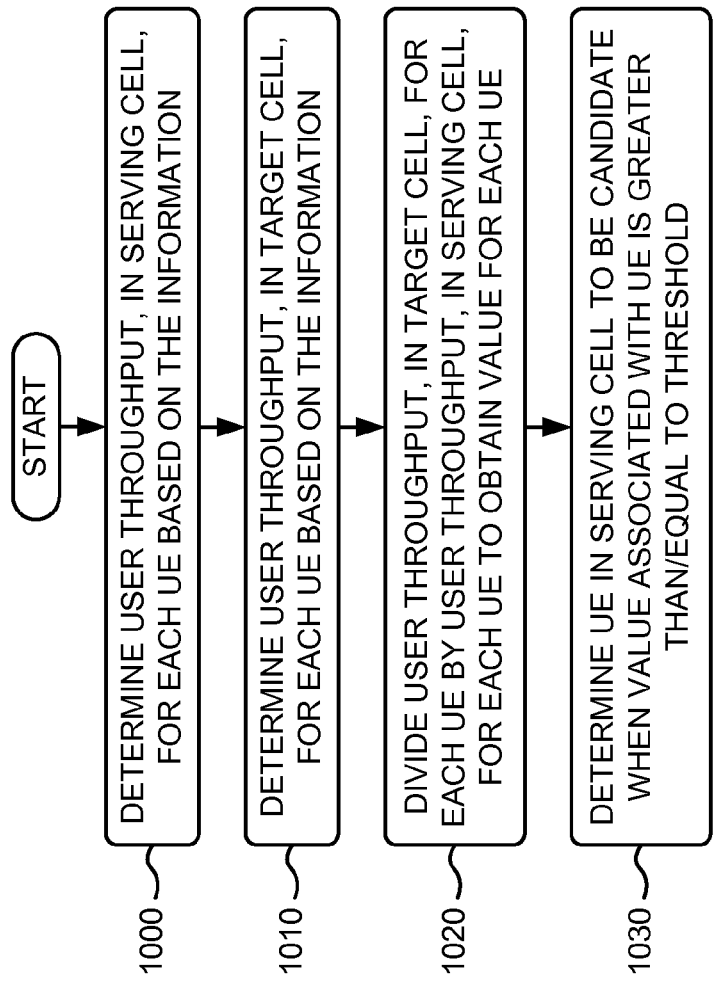

OPTIMIZING A QUALITY OF SERVICE (QOS) VIA LOAD BALANCING

TECHNICAL FIELD

Embodiments described herein relate generally to communication systems, and, more particularly, to optimizing a quality of service (QoS), via load balancing, in a telecommunication system.

BACKGROUND

Operators of telecommunication networks seek to utilize network resources (e.g., base stations associated with cells) in the best possible way to maximize user experience. Due to fluctuations in traffic demand, a load on a cell varies over time. However, it is not economically feasible to arrange a telecommunication network so that the network can always handle traffic demand.

Load balancing is one method that may be used to improve resource usage in a telecommunication network (e.g., a wireless or cellular network). Load balancing typically strives to offload traffic from an overloaded (or close to overloaded) cell to one or more other less loaded cells that may handle extra traffic. In the Third Generation Partnership Project (3GPP) standardization of Long Term Evolution (LTE) technology, load balancing is proposed that equalizes resource usage and enables base stations to exchange resource utilization percentages with each other over a direct interface.

However, current load balancing solutions typically assume some frequency planning so that two adjacent cells do not operate at the same frequency. Since the cells operate on different frequencies, a UE's connection that is prematurely transferred from a serving cell to a target cell may not cause any significant radio impairments to the serving cell. A successful transfer of a UE from a serving cell to a target cell may depend on whether a distance between the serving cell and the UE is too large to jeopardize a call or session for the transferred UE (e.g., due to a weak signal). In systems using single cell (1-cell) reuse (e.g., the 3GPP LTE standard), changing a cell affiliation for a UE will change the frequency interference situation for the moved UE as well as for other UEs.

In current systems, moving UEs from a serving cell to a target cell that is not a strongest cell may result in more resources being available for UEs remaining in the serving cell, and may result in less resources being available for existing UEs in the target cell. Furthermore, interference patterns will change for the UEs. For example, prior to the move, the moved UEs do not interfere with other UEs in the serving cell, but interfere with other cells. After the move, the moved UEs interfere with the UEs remaining in the serving cell, but do not interfere with UEs in the target cell. Higher interference levels in the cells may also result in a lower achievable bit rate for the UEs.

A shortcoming of the 3GPP LTE load balancing standard is the focus on balancing resource usage between cells. Such an approach fails to address user throughput for the UE, which is becoming increasingly important for data users. Other load balancing approaches often attempt to balance a number of users based on the assumption that all users (e.g., UEs) have the same service needs (e.g., a single voice session). High data peak rates by UEs may only be experienced during good transmission conditions and at times of few active users. In order to provide a trustworthy broadband service, it may be more important to provide as high a user throughput as possible for unfortunate users. For example, if a user (e.g., UE) receives six or nine megabits per second (Mbps) of data, user throughput may not make a noticeable difference for the user. However, if a user often experiences fifty kilobits per second (kbps) and, alternatively, almost never experiences below two-hundred and fifty kbps, the user throughput may significantly contribute to a user's experience. In other words, increasing the fairness among users may raise a performance of users that otherwise may underperform.

SUMMARY

It is an object of the invention to overcome at least some of the above disadvantages, and to provide systems and/or methods that optimize quality of service (QoS), via load balancing, in telecommunication networks.

An embodiment described herein may provide a method in a wireless network that includes a device. The method may include detecting, by the device, an overload in a serving cell of the wireless network based on information associated with the serving cell; determining, by the device and when the overload in the serving cell is detected, user equipment in the serving cell that are candidates to move to a target cell of the wireless network based on calculated or measured user throughputs of user equipment in the serving cell; selecting, by the device, one or more of the candidate user equipment to move to the target cell; and moving, by the device, the selected user equipment to the target cell.

Another embodiment described herein may provide a device in a wireless network that includes cells. The device may include a memory to store a group of instructions, and a processor to execute instructions in the memory to detect an overload in a first cell of the wireless network based on information associated with the first cell, and determine, when the overload in the first cell is detected, user equipment in the first cell that are candidates to move to a second cell of the wireless network based on calculated user throughputs of user equipment in the first cell. The processor may further execute instructions in the memory to rank the candidate user equipment, select one or more of the candidate user equipment to move to the second cell based on the rankings of the candidate user equipment, and move the selected user equipment to the second cell.

Still another embodiment described herein may provide a computer-readable memory device that stores instructions executable by at least one processor. The computer-readable medium may include one or more instructions for calculating a user throughput of each user equipment in a serving cell of a wireless network based on: a path gain, associated with the serving cell, for each of the user equipment; a number of the user equipment in the serving cell; a path gain, associated with a target cell of the wireless network, for each of the user equipment; and a number of user equipment in the target cell. The computer-readable medium may also include one or more instructions for detecting an overload in the serving cell based on information associated with the serving cell, and one or more instructions for determining, when the overload in the serving cell is detected, user equipment in the serving cell that are candidates to move to the target cell based on the calculated user throughputs of user equipment in the serving cell. The computer-readable medium may further include one or more instructions for ranking the candidate user equipment, one or more instructions for selecting one or more of the candidate user equipment to move to the target cell based on the rankings of the candidate user equipment, and one or more instructions for moving the selected user equipment to the target cell.

Systems and/or methods described herein may provide a load balancing approach that optimizes a QoS and improves user throughputs for UEs (e.g., for UEs experiencing low user throughput). In order to make a change of cell affiliation (e.g., by moving a handover border between cells), a user throughput may be measured and used in making an evaluation and/or decision regarding the cell change. A process for optimizing a QoS for UEs, via load balancing, may include (e.g., in situations of high resource utilization and/or low user throughput in a serving cell) determining, by the serving cell, a traffic demand from UEs close to a neighbor cell (e.g., a target cell). In one example, this may include determining an instantaneous number of UEs associated with the serving cell (e.g., at a particular time). Alternatively or additionally, this may include determining a time-averaged number of UEs associated with the serving cell, which may reflect long-term conditions for the serving cell. Determining what users are close to a target cell may be accomplished by examining measurement reports received from the UEs. If there is substantial UE traffic close to a target cell, the process may evaluate a load on the target cell. If a relation between a number of UEs in the serving cell and a number of users in the target cell is favorable for a move, then one or more UEs may be moved from the serving cell to the target cell. This process may be repeated until there are no more favorable moves.

BRIEF DESCRIPTION OF THE DRAWINGS

FIG. 3 is a diagram of exemplary components of a central node illustrated in FIG. 1;

FIGS. 4A and 4B are diagrams of exemplary interactions among components of an exemplary portion of the network depicted in FIG. 1;

FIG. 6 is a diagram of exemplary functional components of the serving base station depicted in FIG. 1;

FIGS. 7A and 7B depict exemplary interactions among components of an exemplary portion of the network illustrated in FIG. 1 during a handover border shifting operation; and FIGS. 8-12 depict flow charts of an exemplary process for load balancing according to embodiments described herein.

DETAILED DESCRIPTION

The following detailed description refers to the accompanying drawings. The same reference numbers in different drawings may identify the same or similar elements. Also, the following detailed description does not limit the invention.

Figure 1:
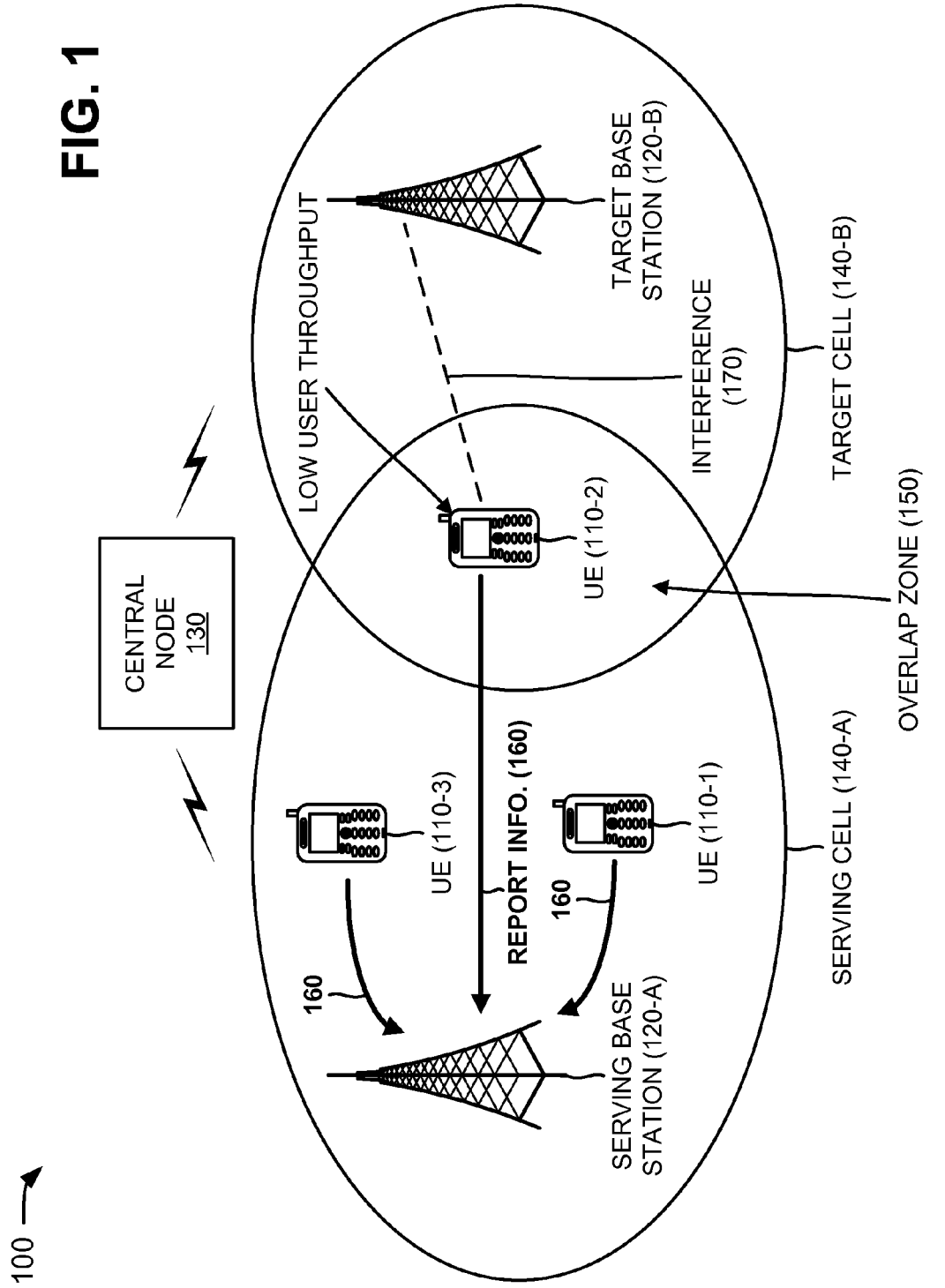
FIG. 1 is a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UEs) 110-1, 110-2, and 110-3 (referred to collectively as "UEs 110," and in some instances individually, as "UE 110"), a serving base station 120-A and a target base station 120-B (referred to collectively as "base stations 120"), and a central node 130. Three UEs 110, two base stations 120, and a single central node 130 have been illustrated in FIG. 1 for simplicity. In practice, there may be more UEs 110, base stations 120, and/or central nodes 130. Also, in some instances, a component in network 100 may perform one or more functions described as being performed by another component or group of components in network 100.

UE 110 may include one or more devices capable of sending/receiving voice and/or data to/from base stations 120. UE 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc. As used herein, the term "user" is intended to be broadly interpreted to include a UE or a user of a UE.

In one embodiment, UE 110 may be served by a cell provided by one of base stations 120. For example, as shown in FIG. 1, serving base station 120-A may create a serving cell 140-A, and target base station 120-B may create a target cell 140-B. UEs 110-1, 110-2, and 110-3 may be served by serving cell 140-A. However, UE 110-2 may be close enough to target base station 120-B (e.g., within an overlap zone 150 between serving cell 140-A and target cell 140-B) so that UE 110-2 is capable of being served by target cell 140-B. In one example, UE 110-2 may be a experiencing a low user throughput and may receive interference 170 from target base station 120-B (e.g., due to UE's 110-2 location in overlap zone 150). As further shown in FIG. 1, UEs 110 may provide report information 160 to serving base station 120-A. Report information 160 may include measurement reports (e.g., measurements of received power) associated with UEs 110, signal strengths received by UEs 110 from base station 120-A, identifiers associated with UEs 110, lists of target cells that UEs 110 can see, signal strengths received by UEs 110 from base station 120-B (if applicable), etc.

Each of base stations 120 (also referred to as "Node Bs") may include one or more devices that receive voice and/or data from a device (e.g., central node 130) and transmit that voice and/or data to UEs 110 via an air interface. Each of base stations 120 may also receive voice and/or data from UEs 110 over an air interface and transmit that voice and/or data to other devices of network (e.g., central node 130) or to other UEs 110. In an exemplary embodiment, base station 120-A may receive report information 160 from UEs 110 and may determine serving cell 140-A path gain information for each of UEs 110, a number of UEs 110 associated with serving cell 140-A, etc. based on report information 160. Although not shown in FIG. 1, base station 120-B may also receive report information 160 from UEs 110 and may determine base station target cell 140-B path gain information for each of UEs 110, a number of UEs 110 associated with target cell 140-B, etc. based on report information 160. In one example, base stations 120-A and 120-B may exchange such information (e.g., path gain information, number of UEs 110 associated with base stations 120, etc.) with each other.

Central node 130 may include one or more devices that control and manage base stations 120. Central node 130 may also perform data processing to manage utilization of radio network services. Central node 130 may support processes such as maintaining network inventory, provisioning services, configuring network components, and/or managing faults. In one embodiment, central node 130 may provide services for network 100, such as order processing, accounting, billing and cost management, network inventory, service provision, network design, network discovery and reconciliation, trouble and fault management, capacity management, network management, field service management, etc. Central node 130 may interconnect with base stations 120 via wired or wireless connections.

Although FIG. 1 shows exemplary components of network 100, in other embodiments, network 100 may contain fewer, different, differently arranged, or additional components than depicted in FIG. 1.

Figure 2:
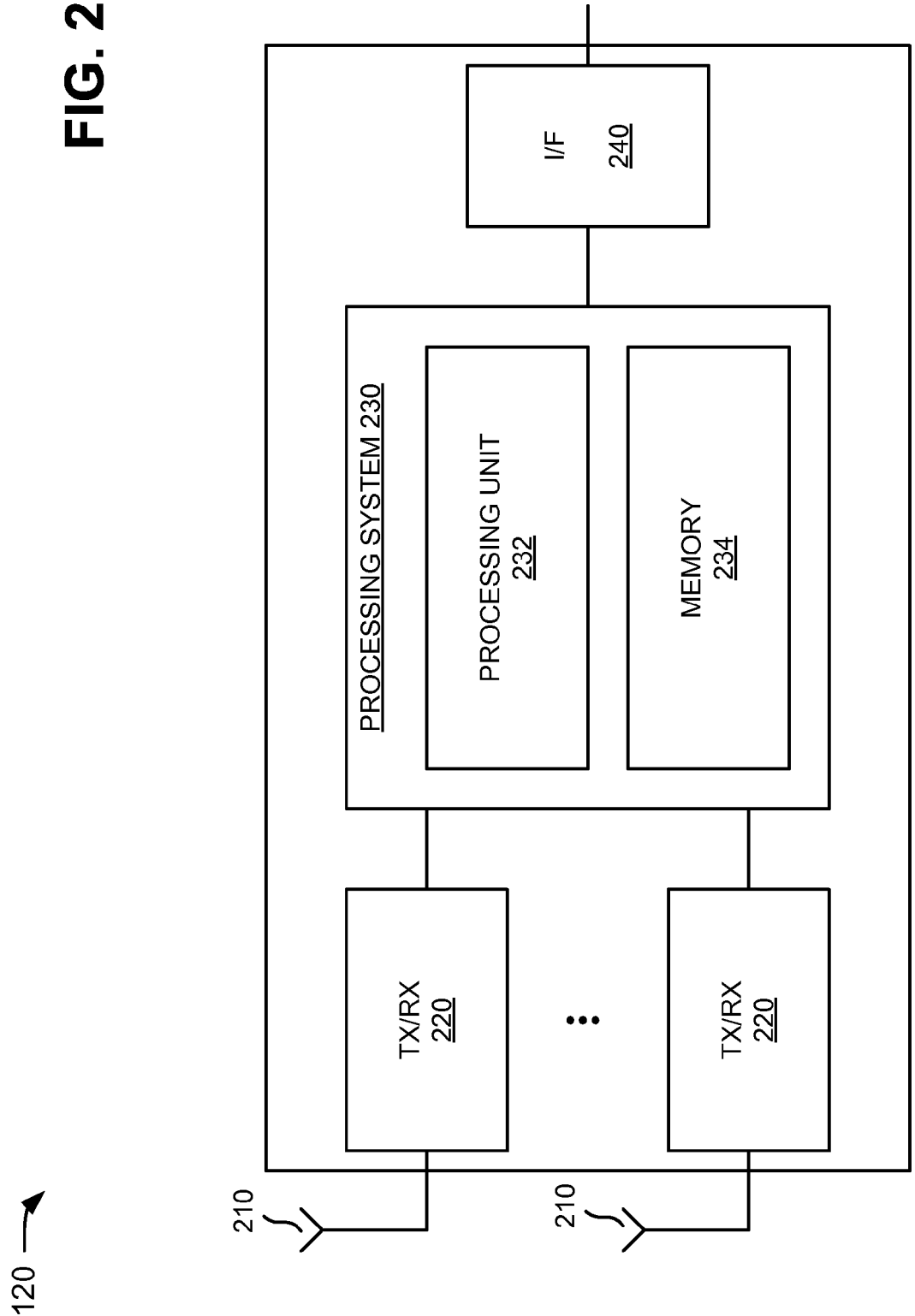
FIG. 2 is a diagram of exemplary components of a serving base station or a target base station depicted in FIG. 1.

FIG. 2 illustrates a diagram of exemplary components of a base station 120 that may correspond to serving base station 120-A or target base station 120-B. As shown in FIG. 2, base station 120 may include antennas 210, transceivers (TX/RX) 220, a processing system 230, and an interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 120. Processing system 230 may also process information received via transceivers 220 and/or interface 240. As illustrated in FIG. 2, processing system 230 may include a processing unit 232 and a memory 234. Processing unit 232 may include one or more processors, microprocessors, application specific integrated circuits (ASICs), field programmable gate arrays (FPGAs), or the like. Processing unit 232 may process information received via transceivers 220 and/or interface 240. In addition, processing unit 232 may transmit control messages and/or data messages, and may cause those control messages and/or data messages to be transmitted via transceivers 220 and/or interface 240. Processing unit 232 may also process control messages and/or data messages received from transceivers 220 and/or interface 240. Memory 234 may include a random access memory (RAM), a read-only memory (ROM), and/or another type of memory to store data and instructions that may be used by processing unit 232.

Interface 240 may include one or more line cards that allow base station 120 to transmit data to and receive data from another base station 120 or central node 130. In one example, interface 240 may include an X2 interface that enables base stations 120 to exchange information related to performing a load balancing operation.

As described herein, base station 120 may perform certain operations in response to processing unit 232 executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 120, in other embodiments, base station 120 may contain fewer, different, differently arranged, or additional components than depicted in FIG. 2. Alternatively or additionally, one or more components of base station 120 may perform one or more other tasks described as being performed by one or more other components of base station 120.

FIG. 3 depicts a diagram of exemplary components of a device 300 that may correspond to central node 130. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, ASICs, FPGAs, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 100.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other embodiments, device 300 may contain fewer, different, or additional components than depicted in FIG. 3. Alternatively or additionally, one or more components of device 300 may perform one or more other tasks described as being performed by one or more other components of device 300.

Figure 4B:
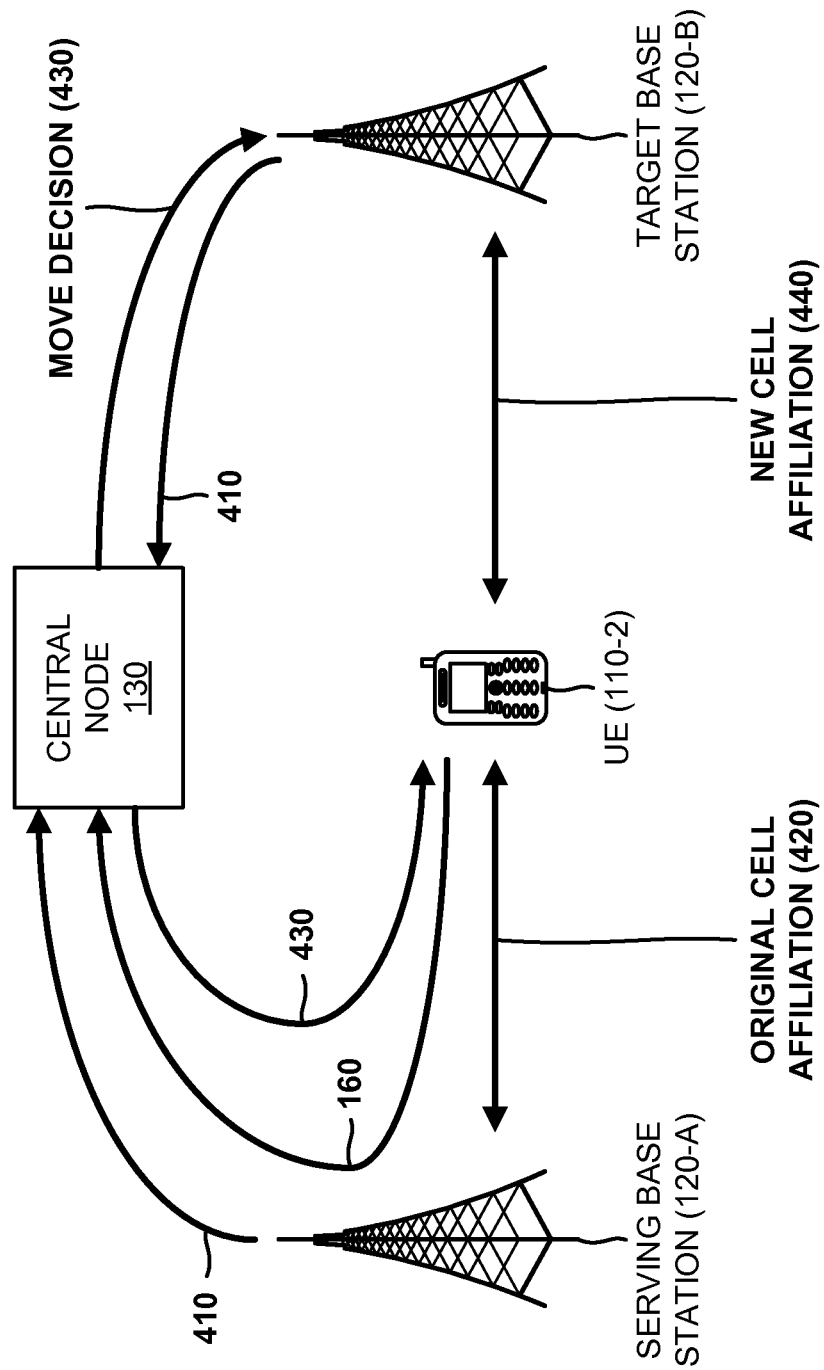

FIGS. 4A and 4B depict diagrams of exemplary interactions among components of an exemplary portion 400 of network 100. As illustrated in FIGS. 4A and 4B, exemplary network portion 400 may include UE 110-2, serving base station 120-A, target base station 120-B, and central node 130 (FIG. 4B only). UE 110-2 may include the features described above in connection with, for example, FIG. 1. Serving base station 120-A and target base station 120-B may include the features described above in connection with, for example, FIGS. 1 and 2. Central node 130 may include the features described above in connection with, for example, FIGS. 1 and 3.

As further shown in FIG. 4A, UE 110-2 may provide report information 160 to serving base station 120-A. Serving base station 120-A and target base station 120-B may exchange (e.g., via interface 240 (FIG. 2)) information 410. For example, serving base station 120-A and target base station 120-B may exchange serving cell 140-A path gain information for each of UEs 110, a number of UEs 110 associated with serving cell 140-A (FIG. 1), target cell 140-B path gain information for each of UEs 110, and/or a number of UEs 110 associated with target cell 140-B (FIG. 1) via information 410. As further shown in FIG. 4A, UE 110-2 may have an original cell affiliation 420 with serving base station 120-A (e.g., with serving cell 140-A).

Serving base station 120-A may detect an overload (e.g., a load exceeding a particular threshold or exceeding a capacity of serving base station 120-A) in serving cell 140-A based on report information 160 and/or information 410. When the overload in serving cell 140-A is detected, serving base station 120-A may determine UEs 110 in serving cell 140-A that are candidates to move to target cell 140-B based on calculated user throughputs of UEs 110 in serving cell 140-A. For example, serving base station 120-A may determine UE 110-2 (e.g., since it is in overlap zone 150 (FIG. 1)) as a candidate to move to target cell 140-B based on a calculated user throughput associated with UE 110-2. Alternatively or additionally, serving base station 120-A may determine the candidate UEs 110 based on other events, such as when moving the determined UEs 110 is favorable (e.g., when user throughputs of UEs 110 in serving cell 140-A decline due to high resource utilization), periodically (e.g., after a particular time period), etc.

In exemplary embodiments, serving base station 120-A may determine the candidate UEs 110 in real time, substantially real time, or less than real time (e.g., to adapt to busy hour variations). Serving base station 120-A may calculate long-term trends associated with moving UEs 110, and may use this information to recommend long-term modifications (e.g., changing cell sizes by changing output powers of base stations 120, changing antenna arrangements of base stations 120, adding new base stations 120, etc.) to a network administrator. Implementation of such recommendations may reduce a need for future UE 110 moves.

In order to make a correct decision on what, if any, UEs 110 to move to another cell, a significant amount of information is typically required. However, according to embodiments described herein, an estimate of user throughputs of UEs 110 in serving cell 140-A may be determined (e.g., and used to make the move decision by serving base station 120-A) with much less information. If it assumed that interferences associated with UEs 110 are approximately the same (e.g., regardless of which cells are communicating with UEs 110) and that powers used by UEs 110 are approximately the same, a bit rate (bit_rate$_{serving}$) of a UE 110 (e.g., UE 110-2) associated with serving base station 120-A may be proportional to a path gain (g$_{serving}$) of UE 110-2 in serving base station 120-A:

bit_rate$_{serving}$ ∝ g$_{serving}$.

Typically, a UE 110 may not be alone in serving cell 140-A and serving base station 120-A resources may be shared between a number (n$_{serving}$) of UEs 110 associated with serving base station 120-A. Thus, a user throughput (user_throughput$_{serving}$) of UE 110-2 in serving base station 120-A may be estimated as follows:

$$\text{user\_throughput}_{serving} \propto \frac{g_{serving}}{n_{serving}}.$$

If UE 110-2 is moved to target base station 120-B, a user throughput (user_throughput$_{target}$) of UE 110-2 in target base station 120-B may be estimated as follows:

$$\text{user\_throughput}_{TARGET} \propto \frac{g_{TARGET}}{n_{TARGET}+1},$$

where g$_{target}$ may include a path gain of UE 110-2 in target base station 120-B and n$_{target}$ may include a number of UEs 110 associated with target base station 120-B.

The above estimates of user throughput assume that all serving cells have the same amount of resources available for users. This may not be true since a UE may belong to a certain subscription category, may use a particular service, etc.; or base stations may have different capabilities. That is, the amount of resources to be shared between users of a particular category or service may differ between the serving and target cells, and the user throughputs may be proportional to:

$$\text{user\_throughput}_{serving} \propto \frac{g_{serving}}{n_{serving}} * A_{serving}, \text{ and}$$

$$\text{user\_throughput}_{target} \propto \frac{g_{target}}{n_{target}} * A_{target},$$

where A$_{serving}$ and A$_{target}$ may represent amounts of resources available for a UE of its kind to be shared with other UEs with the same subscription/service profile.

Another factor that may determine the user throughput is interference levels (e.g., interference 170) in the cells, which together with the path gain may determine a transmission quality of a radio link between a UE and base stations. The interference level (i$_{serving}$ or i$_{target}$) can be measured in numerous ways, such as during short idle periods (without any intentional transmission) or by estimating the transmission quality. The relations provided above may be true if the interference levels are the same for the serving and target cells. If the interference levels differ, a more accurate user throughput can then be estimated as follows:

$$\text{user\_throughput}_{serving} \propto \frac{g_{serving}}{i_{serving} * n_{serving}} * A_{serving}, \text{ and}$$

$$\text{user\_throughput}_{target} \propto \frac{g_{target}}{i_{target} * n_{target}} * A_{target}.$$

The path gains between UE 110 and serving base station 120-A and target base station 120-B may be available to serving base station 120-A (e.g., provided by report information 160 from UE 110). Serving base station 120-A may determine a number of active UEs 110 in serving cell 140-A based on report information 160 and a number of active UEs 110 in target cell 140-B based on information 410. In one example, a path gain difference (Δ path gain) between an overloaded serving cell and neighboring target cells for UEs 110 in the serving cell may include the information presented in Table 1 (below).

TABLE 1

| UE Number | Δ Path Gain (dB) | Neighbor Cell | Number of UEs in Neighbor Cell |
|---|---|---|---|
| 3 | −2.0 | C | 4 |
| 17 | −1.5 | C | 4 |
| 4 | −0.5 | E | 8 |
| 8 | +1.5 | G | 2 |
| 16 | +3.0 | B | 0 |
| 3 | +4.0 | F | 3 |
| 2 | +4.0 | D | 5 |

With reference to FIG. 4A, serving base station 120-A may select one or more of the candidate UEs 110 to move to target cell 140-B, and may convey a move decision 430 to the selected UEs 110 and to target base station 120-B. For example, serving base station 120-A may select UE 110-2 to move to target cell 140-B, and may convey move decision 430 to UE 110-2 and to target base station 120-B (e.g., via interface 240 (FIG. 2)). Move decision 430 may include information for moving UE 110-2 to target base station 120-B. Serving base station 120-A may move the selected UEs 110 to target base station 120-B. For example, serving base station 120-A may move UE 110-2 to target base station 120-B, and UE 110-2 may have a new cell affiliation 440 with target cell 140-B.

In one exemplary embodiment, serving base station 120-A may rank the candidate UEs 110 to move to target cell 140-B based on report information 160 and/or information 410. For example, serving base station 160 may rank candidate UEs 110 that are more favorable to move (e.g., UEs 110 that would reduce a greater load on serving base station 120) higher than candidate UEs 110 that are less favorable to move. Serving base station 120-A may select one or more of the candidate UEs 110 to move to target cell 140-B based on the rankings of the candidate UEs 110.

Serving base station 120-A may move UE 110-2 to target base station 120-B in a variety of ways, such as by shifting a handover border (e.g., associated with UE 110-2) a particular amount, by sending handover commands to UE 110-2 which may cause UE 110-2 to begin transmitting to target base station 120-B, etc. If serving base station 120-A determines that UEs 110 should be moved to target base station 120-B (e.g., target cell 140-B), in one example, serving base station 120-A may collectively move UEs 110 to target cell 140-B at the same time. In another example, serving base station 120-A may move a first UE 110 (e.g., a first ranked UE 110) to target cell 140-B at a first time, may move a second UE 110 (e.g., a second ranked UE 110) to target cell 140-B at a second time (different than the first time), and may move a third UE 110 (e.g., a third ranked UE 110) to target cell 140-B at a third time (different that the first and second times). In still another example, serving base station 120-A may shift the border of serving cell 140-A in a stepwise fashion so that the first UE 110 may move to target cell 140-B at the first time, the second UE 110 may move to target cell 140-B at the second time, and the third UE 110 may move to target cell 140-B at the third time.

Instead of serving base station 120-A making move decision 430, in one exemplary embodiment and as shown in FIG. 4B, move decision 430 may be made by central node 130. As shown in FIG. 4B, UE 110-2 may provide report information 160 to central node 130 via serving base station 120-A, and serving base station 120-A and target base station 120-B may provide information 410 to central node 130. Information 410 may include serving cell 140-A path gain information for each of UEs 110, a number of UEs 110 associated with serving cell 140-A, target cell 140-B path gain information for each of UEs 110, and/or a number of UEs 110 associated with target cell 140-B. As further shown in FIG. 4B, UE 110-2 may have original cell affiliation 420 with serving base station 120-A (e.g., with serving cell 140-A).

Central node 130 may detect an overload (e.g., a load exceeding a particular threshold or exceeding a capacity of serving base station 120-A) in serving cell 140-A based on report information 160 and/or information 410. When the overload in serving cell 140-A is detected, central node 130 may determine UEs 110 in serving cell 140-A that are candidates to move to target cell 140-B based on calculated user throughputs of UEs 110 in serving cell 140-A. For example, central node 130 may determine UE 110-2 (e.g., since it is in overlap zone 150) as a candidate to move to target cell 140-B based on a calculated user throughput associated with UE 110-2. Alternatively or additionally, central node 130 may determine the candidate UEs 110 based on other events, such as when moving the determined UEs 110 is favorable (e.g., when user throughputs of UEs 110 in serving cell 140-A decline due to high resource utilization), periodically (e.g., after a particular time period), etc.

In exemplary embodiments, central node 130 may determine the candidate UEs 110 in real time, substantially real time, or less than real time (e.g., to adapt to busy hour variations). Central node 130 may calculate long-term trends associated with moving UEs 110, and may use this information to recommend long-term modifications (e.g., changing cell sizes by changing output powers of base stations 120, changing antenna arrangements of base stations 120, adding new base stations 120, etc.) to a network administrator. Implementation of such recommendations may reduce a need for future UE 110 moves.

Central node 130 may select one or more of the candidate UEs 110 to move to target cell 140-B, and may convey move decision 430 to the selected UEs 110 (e.g., via serving base station 120-A) and to target base station 120-B. For example, central node 130 may select UE 110-2 to move to target cell 140-B, and may convey move decision 430 to UE 110-2 (e.g. via serving base station 120-A) and to target base station 120-B. Central node 130 may instruct serving base station 120-A to move the selected UEs 110 to target base station 120-B. For example, central node 130 may instruct serving base station 120-A to move UE 110-2 to target base station 120-B, and UE 110-2 may have new cell affiliation 440 with target cell 140-B.

In one exemplary embodiment, serving base station 120-A (or central node 130) may begin a move operation periodically or when user throughput in serving cell 140-A declines due to high resource utilization. Serving base station 120-A (or central node 130) may consider traffic in an overlap zone (e.g., overlap zone 150) for each neighbor cell of serving cell 140-A. Serving base station 120-A (or central node 130) may calculate an amount of traffic that may be moved to other neighbor cells. Serving base station 120-A (or central node 130) may evaluate an impact on the user throughput if some UEs 110 were moved to a neighbor cell (e.g., by considering the QoS for the moved UEs 110, UEs 110 remaining in serving cell 140-A, and UEs existing in the neighbor cell).

Although FIGS. 4A and 4B show exemplary components of network portion 400, in other implementations, network portion 400 may contain fewer, different, differently arranged, or additional components than depicted in FIGS. 4A and 4B. Alternatively or additionally, one or more components of network portion 400 may perform one or more other tasks described as being performed by one or more other components of network portion 400.

Figure 5:
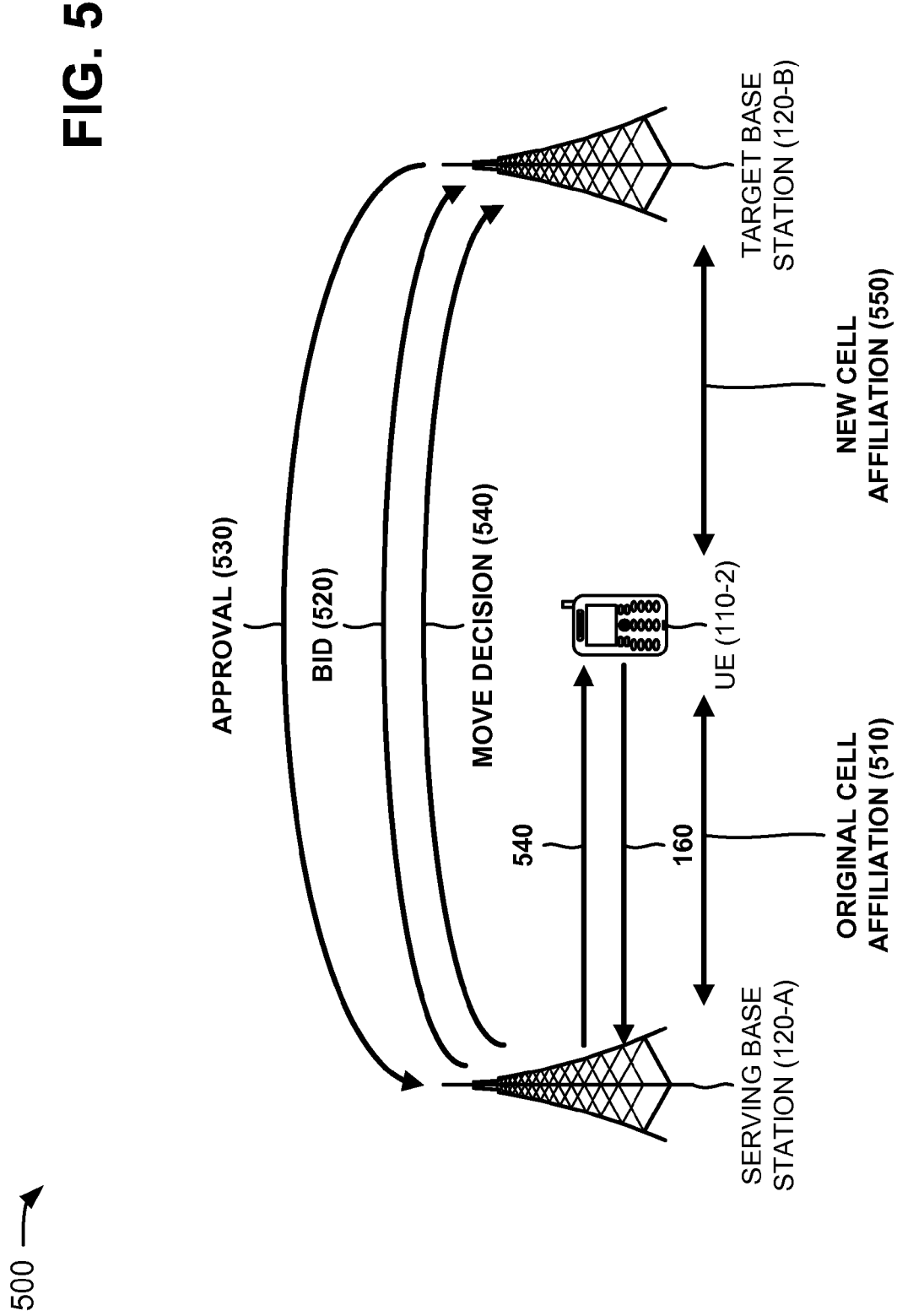
FIG. 5 is a diagram of exemplary negotiations among components of an exemplary portion of the network illustrated in FIG. 1.

FIG. 5 depicts a diagram of exemplary negotiations among components of an exemplary portion 500 of network 100. As illustrated, exemplary network portion 500 may include UE 110-2, serving base station 120-A, and target base station 120-B. UE 110-2 may include the features described above in connection with, for example, FIG. 1. Serving base station 120-A and target base station 120-B may include the features described above in connection with, for example, FIGS. 1 and 2.

As further shown in FIG. 5, UE 110-2 may provide report information 160 to serving base station 120-A. UE 110-2 may have an original cell affiliation 510 with serving base station 120-A (e.g., with serving cell 140-A (FIG. 1)). Serving base station 120-A may detect an overload (e.g., a load exceeding a particular threshold or exceeding a capacity of serving base station 120-A) in serving cell 140-A based on information 410 (FIGS. 4A and 4B). When the overload in serving cell 140-A is detected, serving base station 120-A may determine UEs 110 in serving cell 140-A that are candidates to move to target base station 120-B based on calculated user throughputs of UEs 110 in serving cell 140-A. For example, serving base station 120-A may determine UE 110-2 (e.g., since it is in overlap zone 150 (FIG. 1)) as a candidate to move to target base station 120-B based on a calculated user throughput associated with UE 110-2. Alternatively or additionally, serving base station 120-A may determine the candidate UEs 110 based on other events, such as when moving the determined UEs 110 is favorable (e.g., when user throughputs of UEs 110 in serving cell 140-A decline due to high resource utilization), periodically (e.g., after a particular time period), etc.

Serving base station 120-A may select one or more of the candidate UEs 110 to move to target cell 140-B, and may provide a bid 520 to target base station 120-B (e.g., via interface 240 (FIG. 2). Bid 520 may include information requesting a move of the selected UEs 110 (e.g., with particular traffic profiles) to target base station 120-B. In one example, serving base station 120-A may select UE 110-2 to move to target cell 140-B, and may provide bid 520 to target base station 120-B. Target base station 120-B may review bid 520, and may approve bid 520, reject bid 520, propose other move options, etc. For example, target base station 120-B may receive a bid (e.g., "I would like to move x users with these traffic profiles to your cell") from serving base station 120-A. Target base station 120-B may find this bid too aggressive, and may propose, to serving base station 120-A, a smaller number of UEs 110 to move. Serving base station 120-A and target base station 120-B may negotiate terms of moving the candidate UEs 110 until both serving base station 120-A and target base station 120-B accept the move terms.

If target base station 120-B accepts bid 520, target base station 120-B may send an approval 530 (e.g., accepting bid 520) to serving base station 120-A (e.g., via interface 240). After receiving approval 530, serving base station 120-A may select one or more of the candidate UEs 110 to move to target cell 140-B, and may convey a move decision 540 to the selected UEs 110 and to target base station 120-B. For example, serving base station 120-A may select UE 110-2 to move to target cell 140-B, and may convey move decision 540 to UE 110-2 and to target base station 120-B (e.g., via interface 240). Move decision 540 may include information (e.g., handover information) on how to move UE 110-2 to target base station 120-B. Serving base station 120-A may move the selected UEs 110 to target base station 120-B. For example, serving base station 120-A may move UE 110-2 to target base station 120-B, and UE 110-2 may have a new cell affiliation 550 with target cell 140-B.

Although FIG. 5 shows exemplary components of network portion 500, in other implementations, network portion 500 may contain fewer, different, differently arranged, or additional components than depicted in FIG. 5. Alternatively or additionally, one or more components of network portion 500 may perform one or more other tasks described as being performed by one or more other components of network portion 500. For example, central node 130 may perform the functions described as being performed by serving base station 120-A in connection with FIG. 5.

FIG. 6 depicts diagrams of exemplary functional components of serving base station 120-A. In one embodiment, the functions described in connection with FIG. 6 may be performed by one or more components of base station 120 depicted in FIG. 2. As shown in FIG. 6, serving base station 120-A may include a serving cell throughput calculator 600, a target cell throughput calculator 605, and a move threshold comparer 610.

Serving cell throughput calculator 600 may include any hardware or combination of hardware and software that may receive a serving cell path gain ($g_s$) 615 (e.g., associated with a particular UE 110) and a number ($n_s$) of serving cell users 620 (e.g., based on information in report information 160 and/or information 410). Serving cell throughput calculator 600 may calculate a serving cell user throughput ($u_s$) 625 based on serving cell path gain 615 and the number of serving cell users 620, and may provide serving cell user throughput 625 to move threshold comparer 610. In one example, serving cell throughput calculator 600 may calculate serving cell user throughput 625 according to the following equation:

$$u_s \propto \frac{g_s}{n_s}.$$

Target cell throughput calculator 605 may include any hardware or combination of hardware and software that may receive a target cell path gain ($g_t$) 630 (e.g., associated with the particular UE 110) and a number ($n_t$) of target cell users 635 (e.g., based on information in report information 160 and/or information 410). Target cell throughput calculator 605 may calculate a target cell user throughput ($u_t$) 640 based on target cell path gain 630 and the number of target cell users 635, and may provide target cell user throughput 640 to move threshold comparer 610. In one example, target cell throughput calculator 605 may calculate target cell user throughput 640 according to the following equation:

$$u_t \propto \frac{g_t}{n_t + 1}.$$

Move threshold comparer 610 may include any hardware or combination of hardware and software that may receive serving cell user throughput 625 from serving cell throughput calculator 600, and may receive target cell user throughput 640 from target cell throughput calculator 605. Move threshold comparer 610 may receive a threshold 645 (e.g., from an operator, via a policy, etc.), and may divide target cell user throughput 640 by serving cell user throughput 625 to calculate a quotient ($u_t/u_s$). If the quotient ($u_t/u_s$) is greater than or equal to threshold 645, move threshold comparer 610 may move the particular UE 110 to target cell 140-B, as indicated by reference number 650. If the quotient ($u_t/u_s$) is less than threshold 645, move threshold comparer 610 may keep the particular UE 110 in serving cell 140-A, as indicated by reference number 655.

Although FIG. 6 show exemplary functional components of serving base station 120-A, in other implementations, serving base station 120-A may contain fewer, different, differently arranged, or additional functional components than depicted in FIG. 6. Alternatively or additionally, one or more functional components of serving base station 120-A may perform one or more other tasks described as being performed by one or more other functional components of serving base station 120-A.

As described above, moving traffic (e.g., UEs 110) between cells (e.g., between serving cell 140-A and target cell 140-B) may be accomplished in a variety of ways. One way of moving traffic between cells is to shift a handover border of the cells by applying a handover offset. For stationary UEs 110 this may have a minor impact on performance if the handover offset is small compared to an applied hysteresis.

One feasible technique may include forcing handover for UEs 110 in a hysteresis zone (e.g., kick UEs 110 out of a serving cell).

Figure 7A:
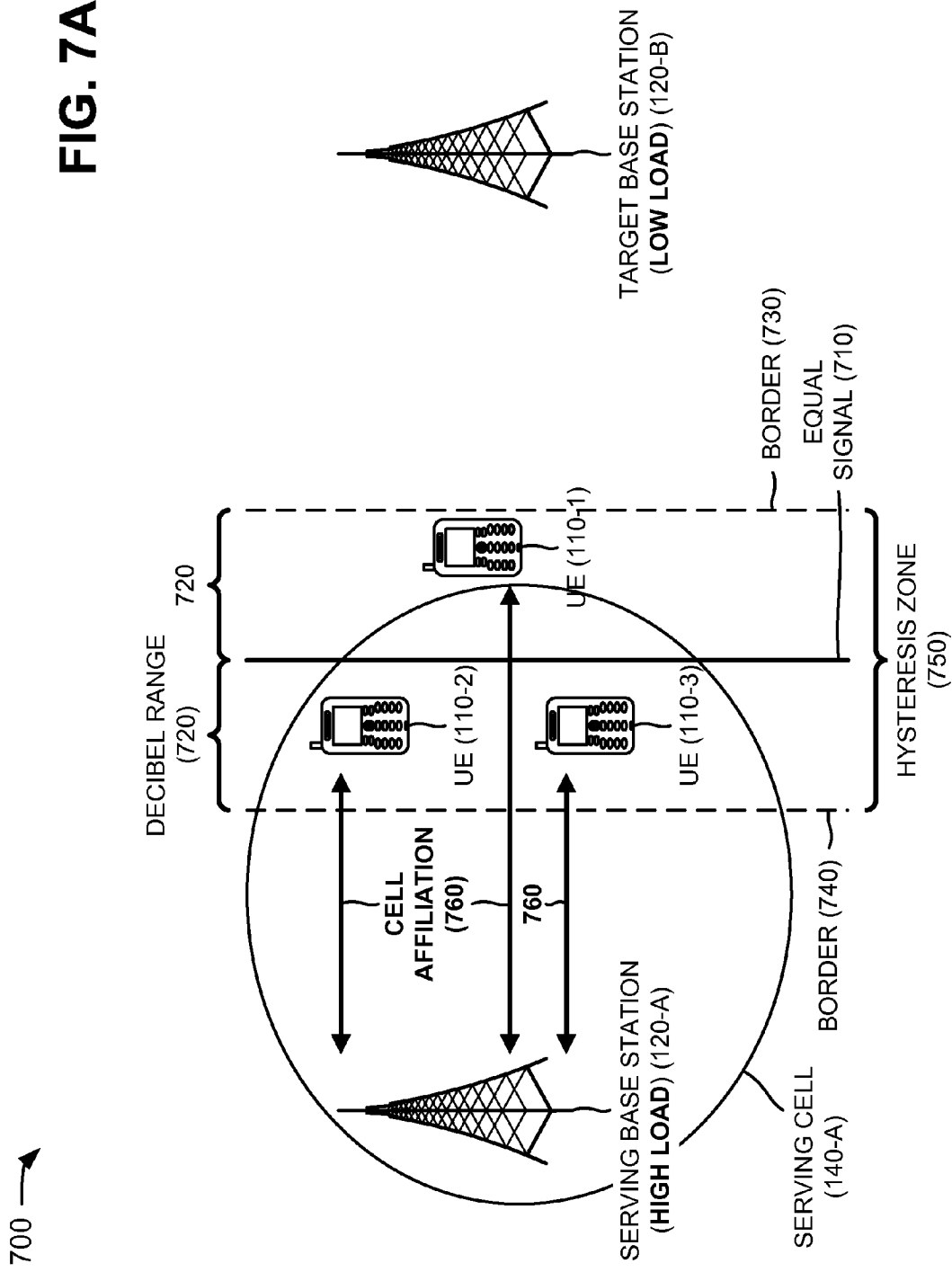

FIGS. 7A and 7B depict exemplary interactions among components of an exemplary portion 700 of network 100 during a handover border shifting operation. As illustrated in FIGS. 7A and 7B, exemplary network portion 700 may include UEs 110-1, 110-2, and 110-3, serving base station 120-A, and target base station 120-B. UEs 110-1, 110-2, and 110-3 may include the features described above in connection with, for example, FIG. 1. Serving base station 120-A and target base station 120-B may include the features described above in connection with, for example, FIGS. 1, 2, and 6.

As further shown in FIG. 7A, serving base station 120-A may be experiencing a high load (e.g., due to UEs 110-1, 110-2, and 110-3 being affiliated with serving base station 120-A), and target base station 120-B may be experiencing a low load (e.g., due to no UEs 110 being affiliated with target base station 120-B). UEs 110-1, 110-2, and 110-3 may experience an equal signal strength from serving base station 120-A and target base station 120-B at a location indicated by reference number 710. A hysteresis decibel range 720 (e.g., +3 dB or some other decibel range) may be defined on either side of equal signal 720, and may establish a first hysteresis border 730 and a second hysteresis border 740 that define a hysteresis zone 750 for UEs 110-1, 110-2, and 110-3. UEs 110-1, 110-2, and 110-3 may have a cell affiliation 760 with serving cell 140-A.

Due to the high load, serving base station 120-A may determine that UEs 110-1, 110-2, and 110-3 are candidates to move to target base station 120-B since UEs 110-1, 110-2, and 110-3 are located within hysteresis zone 750. However, since UE 110-1 is located closer to target base station 120-B that UEs 110-2 and 110-3, serving base station 120-A may determine that UE 110-1 may be moved to target base station 120-B.

In order to move UE 110-1 from serving base station 120-A to target base station 120-B, serving base station 120-A may shift a border of serving cell 140-A by a particular amount. For example, as shown in FIG. 7B, serving base station 120-A may shift the border of serving cell 140-A by an amount substantially equal to decibel range 720. With such a border shift, hysteresis zone 750 may shift so that UEs 110-2 and 110-3 remain in hysteresis zone 750 but UE 110-1 is outside of hysteresis zone 750. Thus, UE 110-1 may be handed over to target base station 120-B (e.g., as shown by cell affiliation 770), which may reduce the load on serving base station 120-A. UEs 110-2 and 110-3 may still be served by serving base station 120-A (e.g., due to being located in hysteresis zone 750), but may potentially be handed over to target base station 120-B, as indicated by reference number 780. If serving base station 120-A actively forces UEs 110-2 and 110-3 to make a handover to target base station 120-B, the load on serving base station 120-A may be further reduced.

Changing a handover border to another cell may lead to successful results (e.g., a reduction in the load on serving base station 120-A). An unloaded neighbor cell (e.g., target cell 140-B) that can handle more UEs 110 (e.g., with only a small modification of the handover border) may be more likely to succeed in improving low end user throughput UEs 110, than a loaded neighbor cell that may require a large shift of the handover border to move enough UEs 110 from serving cell 140-A. In determining whether to change a handover border (e.g., to move UEs 110), serving base station 120-A may consider an availability of free resources (i.e., a load) in target cell 140-B and a number of UEs 110 that may be moved (e.g. a number of UEs 110 per decibel border shift). If a border shift is not needed for all neighbor cells, serving base station 120-A may select a number of neighbor cells that maximizes the lowest user throughput of UEs 110, prioritizes the neighbor cells that require a smallest handover border shift, prioritizes the neighbor cells with the most available resources, maximizes an offload of serving base station 120-A, etc.

After shifting the cell borders and moving UEs 110 to new cells, serving base station 120-A may evaluate effects of the border shift. For example, if serving base station 120-A determines that low end user throughput did not improve or that there were adverse effects on high end user throughput (or cell throughput), serving base station 120-A may revoke the border shift. An unsuccessful border shift may impact future border shift decisions by serving base station 120-A, and may cause serving base station 120-A to not make future border shifts for a particular time period or to make future border shifts smaller. In another example, serving base station 120-A may determine (e.g., based on the evaluated effects of the border shift) whether the border shift should be shifted even further.

There may be several different services (e.g., offered by network 100) that may pose different requirements (e.g., delay and bit error targets, guaranteed and non-guaranteed bit rates, etc.) on service delivery. In one example, serving base station 120-A may adhere to these service requirements (or classes) when determining handover border shifts. In another example, serving base station 120-A may adhere to only some of the service requirements when determining handover border shifts (e.g., serving base station 120-A may move the handover border for best effort data users (e.g., UEs 110) but may not move the handover border for voice users (e.g. UEs 110).

Although FIGS. 7A and 7B show exemplary components of network portion 400, in other implementations, network portion 700 may contain fewer, different, differently arranged, or additional components than depicted in FIGS. 7A and 7B. Alternatively or additionally, one or more components of network portion 700 may perform one or more other tasks described as being performed by one or more other components of network portion 700.

FIGS. 8-12 illustrate flow charts of an exemplary process 800 for load balancing according to embodiments described herein. In one embodiment, process 800 may be performed by serving base station 120-A. In other embodiments, some or all of process 800 may be performed by another device or group of devices (e.g., central node 130) communicating with serving base station 120-A.

As illustrated in FIG. 8, process 800 may include detecting an overload in a serving cell based on information associated with the serving cell (block 810), and determining UEs 110 in the serving cell that are candidates to move to a target cell (block 820). For example, in embodiments described above in connection with FIG. 4A, serving base station 120-A may detect an overload (e.g., a load exceeding a particular threshold or exceeding a capacity of serving base station 120-A) in serving cell 140-A. When the overload in serving cell 140-A is detected, serving base station 120-A may determine UEs 110 in serving cell 140-A that are candidates to move to target cell 140-B based on calculated user throughputs of UEs 110 in serving cell 140-A. In one example, serving base station 120-A may determine UE 110-2 as a candidate to move to target cell 140-B (e.g., since UE 110-2 is in overlap zone 150).

As further shown in FIG. 8, one or more of the candidate UEs to move to the target cell may be selected (block 830). For example, in embodiments described above in connection with FIG. 4A, serving base station 120-A may select one or more of the candidate UEs 110 to move to target cell 140-B, and may convey move decision 430 to the selected UEs 110 and to target base station 120-B. In one example, serving base station 120-A may select UE 110-2 to move to target cell 140-B, and may convey move decision 430 to UE 110-2 and to target base station 120-B (e.g., via interface 240). Move decision 430 may include information (e.g., handover information) for moving UE 110-2 to target base station 120-B.

Returning to FIG. 8, a move of the selected UEs may be negotiated with the serving cell and target cell (block 840), and the selected UEs may be moved to the target cell when the target cell approves the move via the negotiation (block 850). For example, in embodiments described above in connection with FIG. 5, serving base station 120-A may provide bid 520 to target base station 120-B. Bid 520 may include information requesting a move of the selected UEs 110 (e.g., with particular traffic or user profiles) to target base station 120-B. Target base station 120-B may review bid 520, and may approve bid 520, reject bid 520, propose other move options, etc. Serving base station 120-A and target base station 120-B may negotiate terms of moving the candidate UEs 110 until both serving base station 120-A and target base station 120-B accept the move terms. If target base station 120-B accepts bid 520, target base station 120-B may send approval 530 (e.g., accepting bid 520) to serving base station 120-A. After receiving approval 530, serving base station 120-A may select one or more of the candidate UEs 110 to move to target cell 140-B, and may convey move decision 540 to the selected UEs 110 and to target base station 120-B. Move decision 540 may include information (e.g., handover information) for moving the selected UEs 110 to target base station 120-B. Serving base station 120-A may move the selected UEs 110 to target base station 120-B (e.g. to target cell 140-B).

Process blocks 810/820 may include the process blocks depicted in FIG. 9. As illustrated in FIG. 9, process blocks 810/820 may include receiving a serving cell path gain for each UE (block 900), receiving a number of serving cell UEs (block 910), receiving a target cell path gain for each UE (block 920), receiving a number of target cell UEs (block 930), and creating a ranked list of candidate UEs to move based on the received information (block 940). For example, in embodiments described above in connection with FIG. 4A, UEs 110 may provide report information 160 to serving base station 120-A. Report information 160 may include measurement reports (e.g., measurements related to different signature sequences) associated with UEs 110. Serving base station 120-A and target base station 120-B may exchange information 410, which may include serving cell 140-A path gain information for each of UEs 110, a number of UEs 110 associated with serving cell 140-A, target cell 140-B path gain information for each of UEs 110, a number of UEs 110 associated with target cell 140-B, etc. In one example, serving base station 120-A may rank the candidate UEs 110 to move to target cell 140-B based on report information 160 and/or information 410. For example, serving base station 160 may rank candidate UEs 110 that are more favorable to move (e.g., UEs 110 that would reduce a greater load on serving base station 120) higher than candidate UEs 110 that are less favorable to move. Serving base station 120-A may select one or more of the candidate UEs 110 to move to target cell 140-B based on the rankings of the candidate UEs 110.

Process block 820 may include the process blocks depicted in FIG. 10. As illustrated in FIG. 10, process block 820 may include determining a user throughput, in the serving cell, for each UE based on the information associated with the serving cell (block 1000), determining, a user throughput, in the target cell, for each UE based on the information associated with the serving cell (block 1010), dividing the user throughput, in target cell, for each UE by the user throughput, in serving cell, for each UE to obtain a value for each UE (block 1020), and determining a UE in the serving cell to be a candidate when the value associated with the UE is greater than or equal to a threshold (block 1030). For example, in embodiments described above in connection with FIG. 6, serving cell throughput calculator 600, of serving base station 120-A, may calculate serving cell user throughput ($u_s$) 625 based on serving cell path gain 615 and the number of serving cell users 620. Target cell throughput calculator 605, of serving base station 120-A, may calculate target cell user throughput ($u_t$) 640 based on target cell path gain 630 and the number of target cell users 635. Move threshold comparer 610, of serving base station 120-A, may divide target cell user throughput 640 by serving cell user throughput 625 to calculate a quotient ($u_t/u_s$). If the quotient ($u_t/u_s$) is greater than or equal to threshold 645, move threshold comparer 610 may move the particular UE 110 to target cell 140-B (i.e., the particular UE 110 may be a candidate). If the quotient ($u_t/u_s$) is less than threshold 645, move threshold comparer 610 may keep the particular UE 110 in serving cell 140-A (i.e., the particular UE 110 may not be a candidate).

Figure 11:
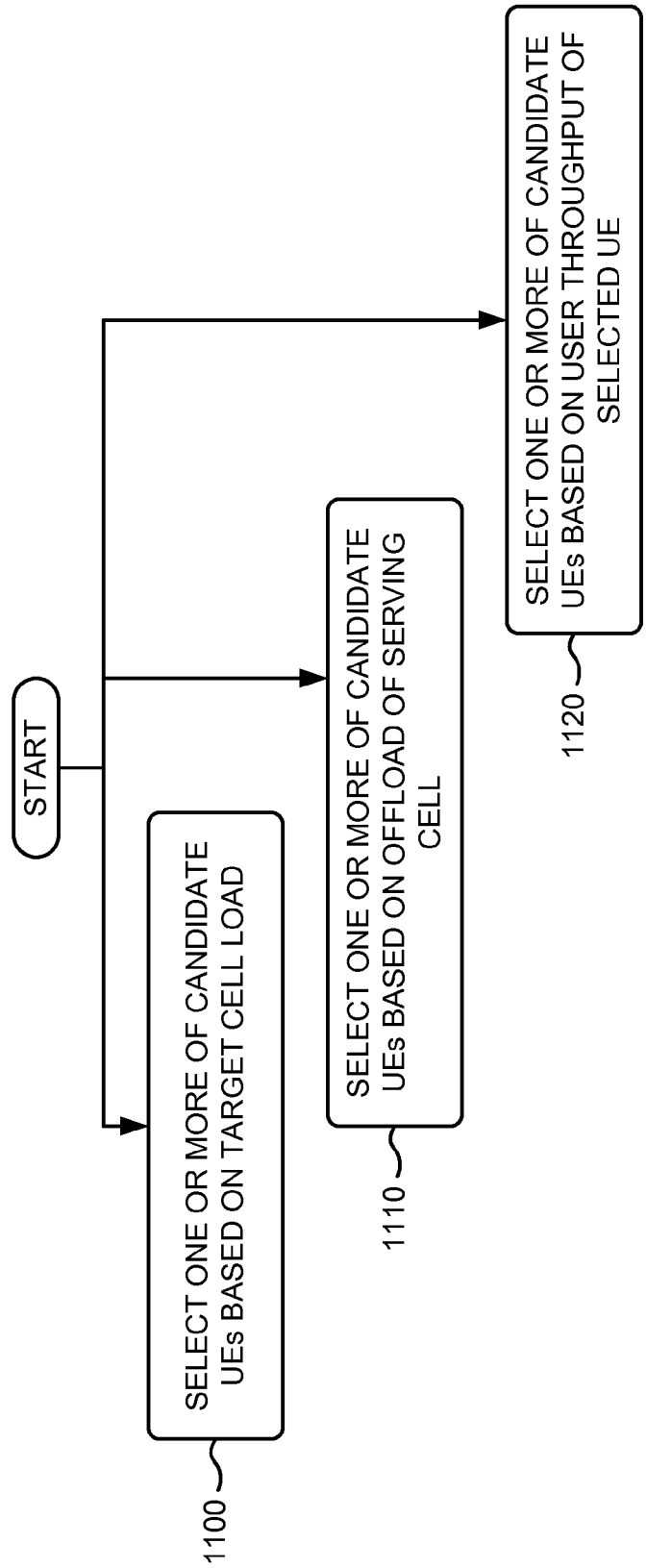

Process block 830 may include the process blocks depicted in FIG. 11. As illustrated in FIG. 11, process block 830 may include selecting one or more of the candidate UEs based on a target cell load (block 1100), selecting one or more of the candidate UEs based on an offload of the serving cell (block 1110), or selecting one or more of the candidate UEs based on a user throughput of the selected UE (block 1120). For example, in embodiments described above in connection with FIGS. 7A and 7B, in determining whether to change a handover border (e.g., to move UEs 110), serving base station 120-A may consider an availability of free resources (i.e., a load) in target cell 140-B and a number of UEs 110 that may be moved (e.g. a number of UEs 110 per decibel border shift). If a border shift is not needed for all neighbor cells, serving base station 120-A may select a number of neighbor cells that maximizes the lowest user throughput of UEs 110, prioritizes the neighbor cells that require a smallest handover border shift, prioritizes the neighbor cells with the most available resources, maximizes an offload of serving base station 120-A, etc.

Figure 12:
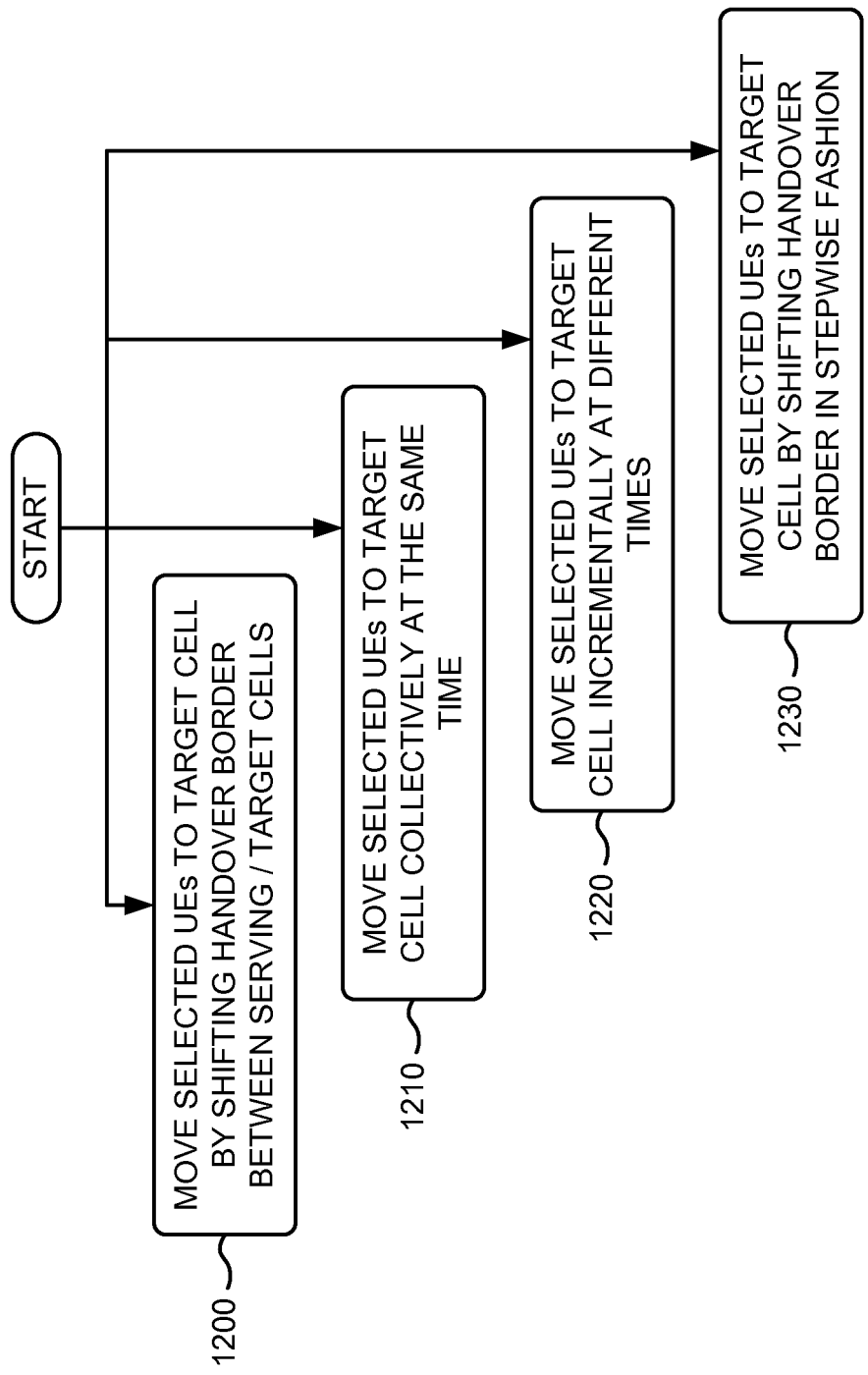

Process block 850 may include the process blocks depicted in FIG. 12. As illustrated in FIG. 12, process block 850 may include moving the selected UEs to the target cell by shifting a handover border between the serving cell and the target cell (block 1200), moving the selected UEs to the target cell collectively at the same time (block 1210), moving the selected UEs to the target cell incrementally at different times (block 1220), or moving the selected UEs to the target cell by shifting the handover border in a stepwise fashion (block 1230). For example, in embodiments described above in connection with FIGS. 4, 7A, and 7B, serving base station 120-A may shift the border of serving cell 140-A by an amount substantially equal to decibel range 720. With such a border shift, hysteresis zone 750 may shift so that UEs 110-2 and 110-3 remain in hysteresis zone 750 but UE 110-1 is outside of hysteresis zone 750. Thus, UE 110-1 may be handed over to target base station 120-B (e.g., as shown by cell affiliation 770). If serving base station 120-A determines that UEs 110 should be moved to target base station 120-B (e.g., target cell 140-B), in one example, serving base station 120-A may collectively move UEs 110 to target cell 140-B at the same time. In another example, serving base station 120-A may move a first UE 110 (e.g., a first ranked UE 110) to target cell 140-B at a first time, may move a second UE 110 (e.g., a second ranked UE 110) to target cell 140-B at a second time (different than the first time), and may move a third UE 110 (e.g., a third ranked UE 110) to target cell 140-B at a third time (different that the first and second times). In still another example, serving base station 120-A may shift the border of serving cell 140-A in a stepwise fashion so that the first UE 110 may move to target cell 140-B at the first time, the second UE 110 may move to target cell 140-B at the second time, and the third UE 110 may move to target cell 140-B at the third time.

Systems and/or methods described herein may provide a load balancing approach that optimizes a QoS and improves user throughputs for UEs. In order to make a change of cell affiliation, a user throughput may be measured and used in making an evaluation and/or decision regarding the cell change. A process for optimizing a QoS for UEs, via load balancing, may include determining, by the serving cell, a traffic demand from UEs close to a neighbor cell (e.g., a target cell). In one example, this may include determining an instantaneous number of UEs associated with the serving cell. If there is substantial UE traffic close to a target cell, the process may evaluate a load on the target cell. If a relation between a number of UEs in the serving cell and a number of users in the target cell is favorable for a move, then one or more UEs may be moved from the serving cell to the target cell. This process may be repeated until there are no more favorable moves.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 8-12, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a wireless network that includes a device, the method comprising:
   detecting, by the device, an overload in a serving cell of the wireless network based on information associated with the serving cell;
   calculating a first user throughput of each user equipment in the serving cell based on a serving cell path gain for each of the user equipment in the serving cell, and a second user throughput of each user equipment in the serving cell based on a target cell path gain for each of the user equipment in the serving cell;
   determining, by the device and when the overload in the serving cell is detected, user equipment in the serving cell that are candidates to move to a target cell of the wireless network based on the calculated first and second user throughputs of user equipment in the serving cell;
   selecting, by the device, all user equipment that are determined to be candidates to move to the target cell and are further determined to be in a hysteresis zone provided between the serving cell and the target cell; and
   moving, by the device, the selected user equipment to the target cell,
   where said determining user equipment in the serving cell that are candidates to move to the target cell includes:
      dividing the second user throughput of each user equipment in the serving cell by the first user throughput of each user equipment in the serving cell to obtain a ratio for each user equipment in the serving cell; and
      determining each respective user equipment in the serving cell to be a candidate to move to the target cell when the ratio associated with the respective user equipment in the serving cell is greater than or equal to a particular threshold;
   where said moving the selected user equipment to the target cell includes:
      ranking the selected user equipment;
      negotiate a change in a handover border provided between the serving cell and the target cell, and
      shifting, based on the negotiation, the handover border in a stepwise fashion causing at least one of the selected user equipment with a first rank to move to the target cell at a first time and causing at least one of the selected user equipment with a second rank to move to the target cell at a second time, where the second time is different than the first time.

2. The method of claim 1, where the device includes one of:
   a base station associated with the serving cell, or
   a central node of the wireless network.

3. The method of claim 1, further comprising:
   determining overlap information associated with the serving cell and the target cell.

4. The method of claim 1, where moving the selected user equipment to the target cell reduces a load on the serving cell.

5. The method of claim 1, where ranking the selected user equipment is based on the corresponding ratios of the selected user equipment.

6. The method of claim 1, where moving the selected user equipment to the target cell includes:
   moving, collectively, at least some of the selected user equipment to the target cell at the same time.

7. A device in a wireless network that includes cells, the device comprising:
   a memory to store a plurality of instructions; and
   a processor to execute instructions in the memory to:
      detect an overload in a serving cell of the wireless network based on information associated with the serving cell,
      calculate a first user throughput of each user equipment in the serving cell based on a serving cell path gain for each of the user equipment in the serving cell, and a second user throughput of each user equipment in the serving cell based on a target cell path gain for each of the user equipment in the serving cell,
      determine, when the overload in the serving cell is detected, user equipment in the serving cell that are candidates to move to a target cell of the wireless network based on the calculated first and second user throughputs of user equipment in the serving cell,
select, by the device, all candidate user equipment in a hysteresis zone provided between the serving cell and the target cell,
move the selected candidate user equipment in the hysteresis zone to the target cell,
where said determining user equipment in the serving cell that are candidates to move to the target cell includes:
dividing the second user throughput of each user equipment in the serving cell by the first user throughput of each user equipment in the serving cell to obtain a ratio for each user equipment in the serving cell; and
determining each respective user equipment in the serving cell to be a candidate to move to the target cell when the ratio associated with the respective user equipment in the serving cell is greater than or equal to a particular threshold;
where said moving the selected user equipment to the target cell includes:
ranking the selected user equipment;
negotiate a change in a handover border provided between the serving cell and the target cell, and
shifting, based on the negotiation, the handover border in a stepwise fashion causing at least one of the selected user equipment with a first rank to move to the target cell at a first time and causing at least one of the selected user equipment with a second rank to move to the target cell at a second time, where the second time is different than the first time.

8. The device of claim 7, where the device includes one of:
a base station associated with the serving cell, or
a central node of the wireless network.

9. The device of claim 7, where the processor is further to execute instructions in the memory to:
determine load information associated with the serving cell,
receive load information associated with the target cell, or
determine overlap information associated with the serving cell and the target cell.

10. The device of claim 7, where moving the selected user equipment to the target cell reduces a load on the first cell.

11. The device of claim 7, where the processor is further to execute instructions in the memory to:
move, collectively, at least some of the selected user equipment to the target cell at the same time.

12. The device of claim 7, where the device includes an interface to exchange load information with a base station associated with the target cell.

13. A non-transitory computer-readable memory device that stores instructions executable by at least one processor, the computer-readable memory device comprising:
one or more instructions for calculating a first user throughput of each user equipment in a serving cell of a wireless network based on:
a path gain, associated with the serving cell, for each of the user equipment in the serving cell,
a number of user equipment in the serving cell;
one or more instructions for calculating a second user throughput of each user equipment in the serving cell based on:
a path gain, associated with a target cell of the wireless network, for each of the user equipment in the serving cell, and
a number of user equipment in the target cell;
one or more instructions for detecting an overload in the serving cell based on information associated with the serving cell;
one or more instructions for determining, when the overload in the serving cell is detected, user equipment in the serving cell that are candidates to move to the target cell based on the calculated first and second user throughputs of user equipment in the serving cell;
one or more instructions for selecting all candidate user equipment in a hysteresis zone provided between the serving cell and the target cell; and
one or more instructions for moving the selected candidate user equipment in the hysteresis zone to the target cell,
where said determining user equipment in the serving cell that are candidates to move to the target cell includes:
dividing the second user throughput of each user equipment in the serving cell by the first user throughput of each user equipment in the serving cell to obtain a ratio for each user equipment the serving cell; and
determining each respective user equipment in the serving cell to be a candidate to move to the target cell when the ratio associated with the respective user equipment in the serving cell is greater than or equal to a particular threshold;
where said moving the selected user equipment to the target cell includes:
ranking the selected user equipment;
negotiate a change in a handover border provided between the serving cell and the target cell, and
shifting, based on the negotiation, the handover border in a stepwise fashion causing at least one selected user equipment with a first rank to move to the target cell at a first time and causing at least one candidate user equipment with a second rank to move to the target cell at a second time, where the second time is different than the first time.

* * * * *

UNITED STATES PATENT AND TRADEMARK OFFICE
CERTIFICATE OF CORRECTION

PATENT NO. : 8,619,708 B2
APPLICATION NO. : 12/627138
DATED : December 31, 2013
INVENTOR(S) : Kallin et al.

Page 1 of 1

It is certified that error appears in the above-identified patent and that said Letters Patent is hereby corrected as shown below:

In the Specification

Column 9, Line 12, delete "serving base station 160" and insert -- serving base station 120-A --, therefor.

Column 15, Line 52, delete "serving base station 160" and insert -- serving base station 120-A --, therefor.

Signed and Sealed this
Fifteenth Day of July, 2014

Michelle K. Lee
*Deputy Director of the United States Patent and Trademark Office*